United States Patent [19]

Hill

[11] Patent Number: 5,375,977
[45] Date of Patent: Dec. 27, 1994

[54] ROTOR BLADE RECORDER SYSTEM

[76] Inventor: Jamie R. Hill, 1325 SE. Fourth St., Cape Coral, Fla. 33904

[21] Appl. No.: 157,506

[22] Filed: Nov. 26, 1993

[51] Int. Cl.⁵ .............................. B64C 27/32
[52] U.S. Cl. ........................................ 416/61
[58] Field of Search .................. 416/51, 52, 53, 61

[56] References Cited

U.S. PATENT DOCUMENTS

| | | | |
|---|---|---|---|
| 4,053,123 | 10/1977 | Chadwick | 416/61 |
| 4,280,185 | 7/1981 | Martin | 364/506 |
| 4,439,106 | 3/1984 | Ferris et al. | 416/61 |
| 4,524,620 | 6/1985 | Wright et al. | 416/61 |
| 4,733,361 | 3/1988 | Krieser et al. | 364/508 |

Primary Examiner—Edward K. Look
Assistant Examiner—Michael S. Lee
Attorney, Agent, or Firm—Frank A. Lukasik

[57] ABSTRACT

A rotor blade recorder system for accumulating the total number of hours that the rotor blades of a helicopter have been rotating at operational speeds. An hour meter and a switch are attached to the outer surface of a mounting rod running through the root end of each of the two blades comprising the main rotor. The switch has a calibrated weight at the end of the switch arm to close the contacts of the switch when the main rotor reaches operational speed. Closing the contacts energizes the self-contained power source in an hour meter. Remote readout terminals permit the hour meter to be read from outside without disturbing the blade assembly. As long as the rotor continues at the operating speed, the hour meter continues to record the time at work.

4 Claims, 5 Drawing Sheets

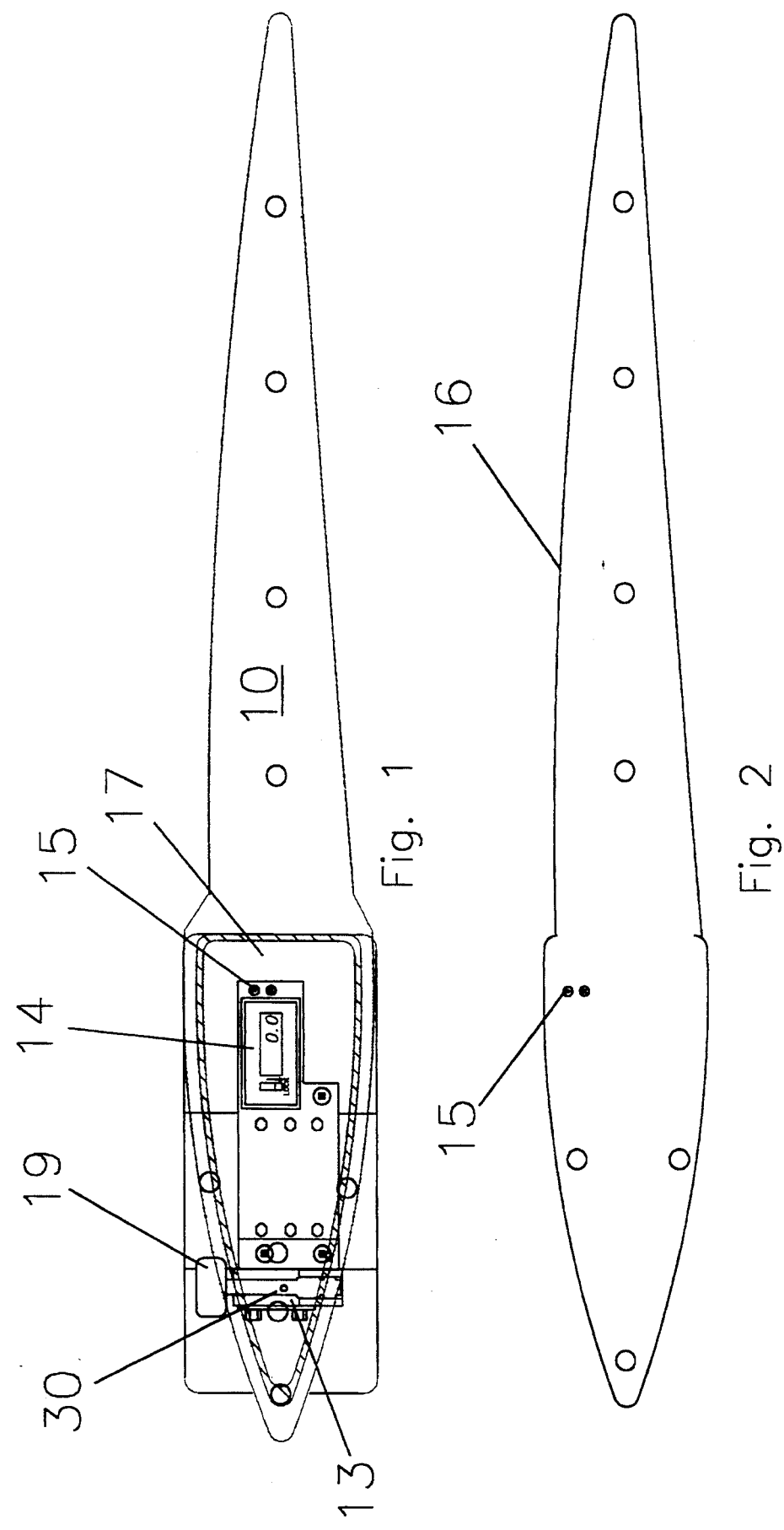

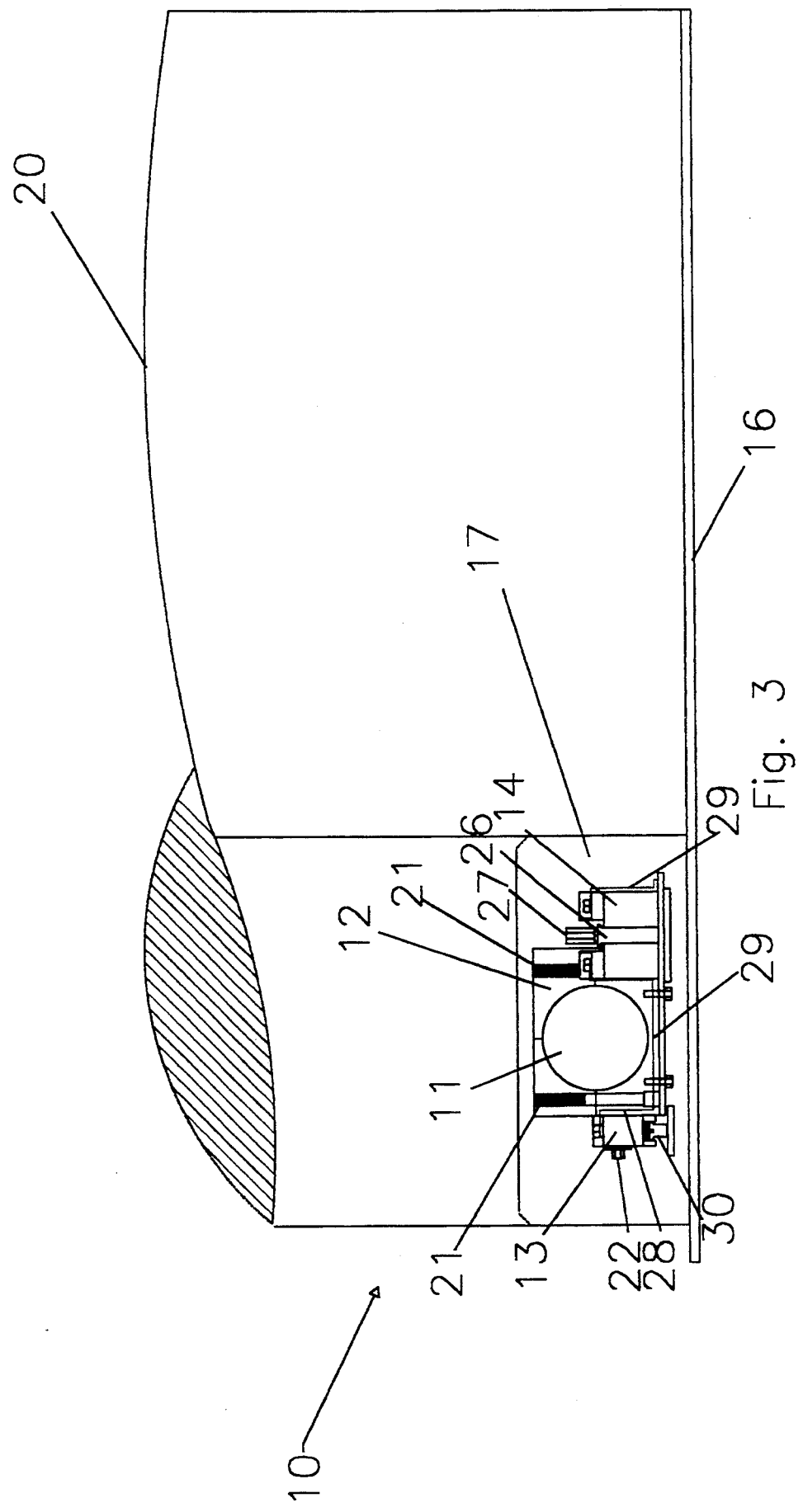

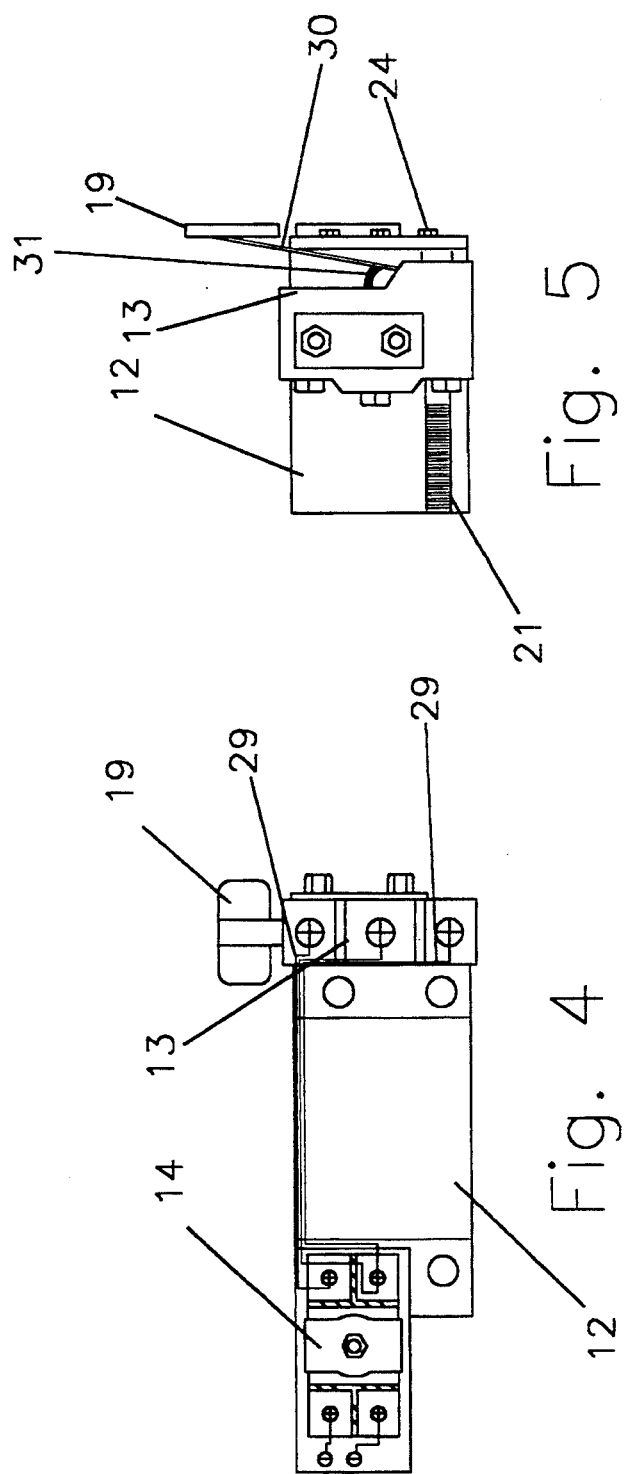

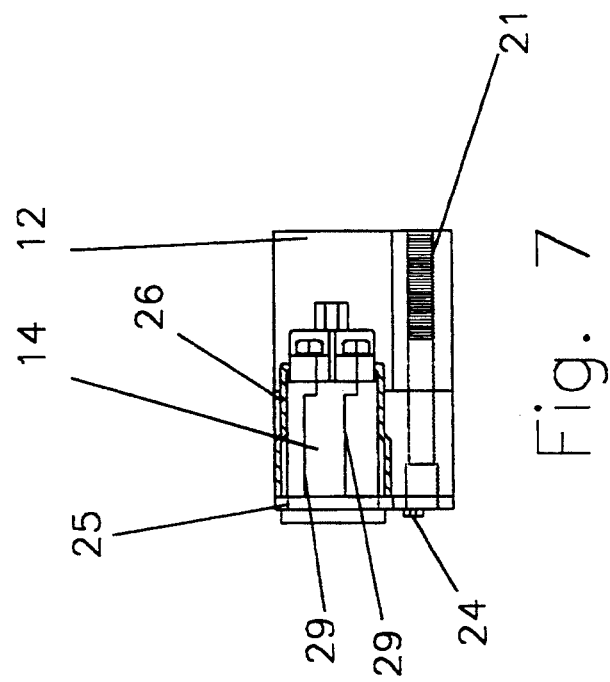
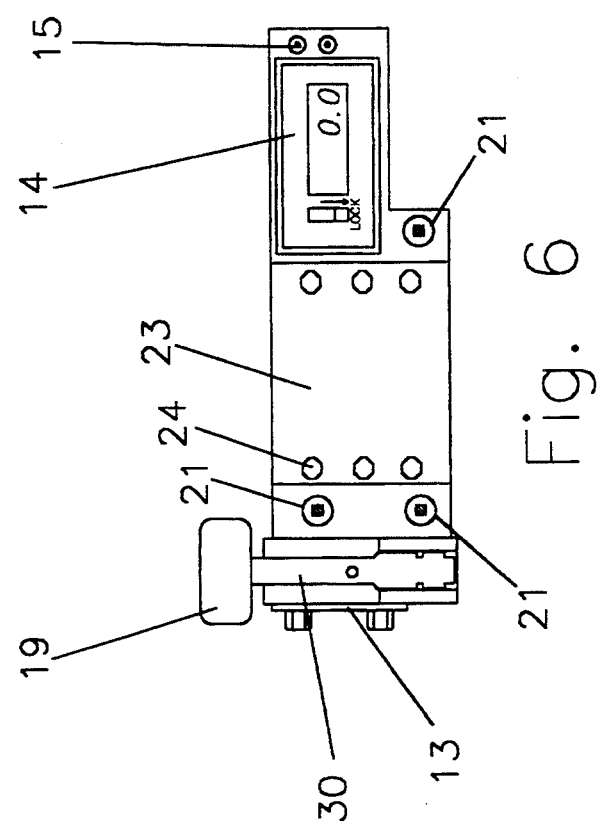

ROTOR BLADE RECORDER SYSTEM

BACKGROUND OF THE INVENTION

1. Field of the invention

The present invention relates generally to flight recording systems for helicopters and relates more specifically to a system for automatically recording the flying hours of helicopter rotor blades.

2. Discussion of the prior art

Aircraft manufacturers have established various service life limits for the rotating parts of aircraft based primarily on the number of repeated and/or alternating fatigue causing stress cycles undergone by the rotating parts. The manufacturers have generally defined a cycle as a flight consisting of the usual start, takeoff, landing and shutdown. Various less usual events have been given a weight as a full cycle or a fraction of a cycle.

Presently, these stress cycles are kept track of by log entries by the pilot or copilot. Generally, also the records are not kept separately for each unit in an aircraft, resulting in inaccurate records and unnecessary replacements. This is particularly pertinent in the life of helicopter rotor blades since the fatigue factors are not of any concern while the engines are merely idling and the rotor blades are not revolving at lifting speeds.

If a system could be found which would automatically keep track of stress cycles, a great deal of accuracy would result. Several prior art attempts have been made such as, for example, U.S. Pat. No. 3,938,762 to Murphy which discloses a rotor blade force track sensing system and automatic span tracking system comprising a vibration sensor mounted to sense manifestation of rotor unbalance causing vibration of the mast support structure. As the mast rotates, unbalanced forces create a sinusoidal vibration in the support structure at the location of the sensor of frequency equal to the speed of shaft rotation. A radial force is sensed when the resultant of the unbalance forces coincides with a reference direction. A radial force in the opposite direction is sensed when the resultant has rotated 180 degrees from the reference direction. The vibration sensor and associated detector circuitry provides a signal proportional to their sinusoidal reaction force or force track error.

U.S. Pat. No. 3,565,206 to Managhan discloses a safety device for unauthorized use of automotive vehicles consisting of a hard S-shaped spring having one end secured to the rotating shaft of the speed indicating arm of a speedometer. The free end of the S-shaped spring is provided with a U-shaped member adapted to engage a roller that is located on the outer end of the arm of an electric switch that is connected into the electric ignition system of an automotive vehicle. The engagement of the outer end of the S-shaped spring takes place when the vehicle has reached a predetermined speed and the shaft of the speedometer has rotated to a predetermined position. A spring-loaded pushbutton is used to activate a swing arm that will reset the safety device by pressing against the S-shaped spring.

U.S. Pat. No. 3,954,229 to Wilson discloses an automatic one-per-rev control system comprising means for generating a reference signal having a frequency related to the speed of rotation of the helicopter rotor and at a phase corresponding to a desired cyclic pitch. In addition, the system includes means for generating a control voltage having a magnitude related to the one-per-rev vibrations in the fuselage of a helicopter. The control voltage is then applied to a modulator wherein it is modulated by the reference signal and applied to the helicopter rotor cyclic pitch control system.

U.S. Pat. No. 3,979,579 to Kleinpeter discloses an aircraft engine cycle recorder which senses engine starting, engine shutdown, landing gear status, engine reversal and throttle setting and derives unit and fractional cycles. The system includes a first memory responsive to the sensors for producing an indication of when the aircraft is in flight and a second memory for producing an indication of when the landing gear are dropped in flight. These memory indications are fed to gates which index the units counter when a takeoff, landing and engine shutdown cycle is completed and which index the fractions counter when a re-takeoff without engine shutdown is accomplished. Other gates cause the units counter to be indexed when the engine is restarted in flight.

Each of the prior art references disclose the use of switch sensors controlling indicators of one type or the other. Neither of the prior art references show the use of a speed related rotor switch nor the recordation of the hours of operation.

SUMMARY OF THE INVENTION

The present invention is a rotor blade recorder system for accumulating the total number of hours that the rotor blades of a helicopter have been rotating at operational speeds. An hour meter and a switch are attached to the outer surface of a mounting rod running through the root end of each of the two blades comprising the main rotor. The switch has a calibrated weight at the end of the switch arm to close the contacts of the switch when the main rotor reaches operational speed. Closing the contacts energizes the self-contained power source in the hourmeter. As long as the rotor continues at the operating speed, the hourmeter continues to record the time at work. Remote readout terminals permit the hourmeter to be read from outside without disturbing the blade assembly.

BRIEF DESCRIPTION OF THE DRAWINGS

FIG. 1 is a front view of the rotor blade recorder system of the invention installed in the root end of a helicopter main rotor blade.

FIG. 2 is a front view of a root end inboard cover.

FIG. 3 is a top view of the rotor blade recorder of the invention installed in the root end of a helicopter main rotor blade.

FIG. 4 is a rear view of the recorder system of the invention.

FIG. 5 is a left end view of the recorder system of the invention showing the activating switch.

FIG. 6 is a front view of the recorder system of the invention.

FIG. 7 is a right end view of the recorder system of the invention.

DESCRIPTION OF THE PREFERRED EMBODIMENT

Figure 8:
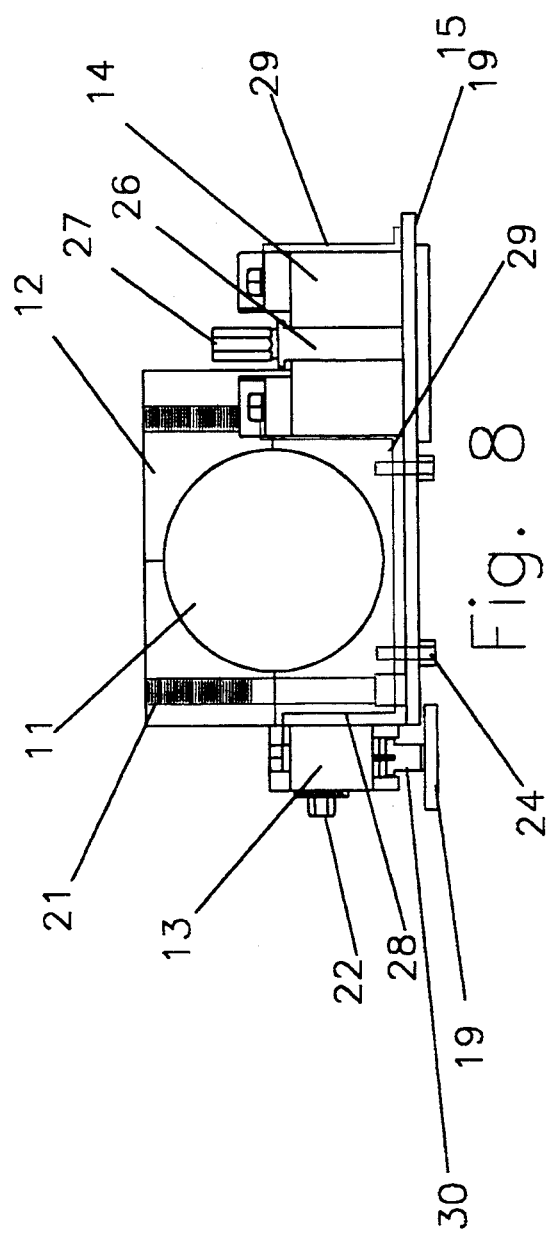
FIG. 8 is a top view of the recorder system of the invention.

The present invention is a flight recording system for recording the total number of hours that the rotor blades of a helicopter have been rotating at operational speeds. In a particular embodiment, the main rotor blades from a Bell UH-1H/V or a UH-1D are modified to include the recorder system of the invention. The main rotor blade of the invention is an all metal bonded assembly consisting of three structural members: an aluminum spar, spar doublers, and a trailing edge strip. Skins, stabilized by honeycomb core, are bonded to the major section by adhesive applied under heat and pressure. Reinforcing doublers, grip plates, and drag plates are bonded to the blade butt end. Metal abrasion strips cover the leading edge for resistance to abrasion.

Referring to FIGS. 1-3 there is shown the root end 10, partially in section, of a main rotor blade 20. The top surface has been removed to show the assembly of the recorder system of the invention installed on the exterior surface of a hollow shaft 11 formed through the root end 10 for installing the rotor blade mounting bolt. Hollow shaft 11 runs from the top surface of root end 10, through a rectangular cavity 17 formed in root end 10 to the bottom surface of root end 10.

Base clamp 12 is formed in two sections and configured to fit within cavity 17 and to clamp hollow shaft 11 with three mounting screws 21. One end of base clamp 12 is notched, at the end with one mounting screw 21, to provide clearance to accommodate hour meter 14. Base clamp 12 may be made from metal, such as aluminum, or plastic. Mounting screws 21 may be vibration proof or otherwise secured against being shaken loose by vibration. At the end opposite hour meter 14, an electrical switch 13, such as a MICRO SWITCH, is fastened directly to base clamp 12 with mounting screws 22. Switch 13 is wired to the appropriate terminals of hour meter 14 with wires 28. Switch 13 comprises a switch arm 30, pivoted at one end of switch 13, and held in an open position by compression spring 31 mounted between the arm 30 and switch 13 base. At the end of arm 30, opposite the pivot end, is a calibrated weight 19 affixed thereto. Weight 19 is calibrated, and a value selected, which is sufficient to force the arm 30 to overcome the force of compression spring 31 when sufficient centrifugal force is generated by a specified RPM of the rotor blade 20.

Mounting plate 23 is also fastened to base clamp 12 with mounting screws 24. Mounting plate 23 may be made in the form of a flat, rectangular plate, and made from a metal such as aluminum or a plastic. Mounting plate 23 has a cutout window 25 which is used for installation of hour meter 14. Hour meter 14 has a self-contained ten year battery service life. After insertion of hour meter 14 in window 25, hour meter clamp 26 is drawn up to and engages the backside of mounting plate 23 by tightening hour meter mounting screw 27. Wires 29 are connected to remote terminals 15 which may be installed on mounting plate 23 or connected to remote terminals 15 installed on root end inboard cover 16. Thus, hour meter 14 may be read on its face or, be concealed, and only be read when the cover 16 is removed or, more conveniently, through terminals 15 whenever it is desired to obtain a reading. For added security against tampering with hour meter 14, inboard cover 16 may be sealed with a tamper proof seal which can readily detect tampering.

It is important to have a device and a method for recording the service life of the rotor blades. At $38,000 per blade, it is tempting to continue using the blades long after the service life of 1000 hours has expired. Without the instant system, a rotor blade could be put out of service, stored for a period of time, and then re-installed with no indication of the previous service hours.

In a preferred embodiment, a Redington, Model 7600, Self Powered Counter, from COUNTERS, INC., Box 608, Windsor, Conn. 06095, was used. The rotor blade recorder system of the invention may be installed during assembly at the aircraft plant or in the field and may be routinely checked during FAA required inspections. Rotor blades which have been in service may be retrofitted with the recorder system and the hour meter may be preset at the estimated or recorded time in service. Installation of the recorder system in every helicopter rotor blade will greatly increase the safety of flying.

This invention is not to be limited by the embodiment shown in the drawings and described in the specification, which is given by way of example and not of limitation, but only in accordance with the scope of the appended claims.

I claim:

1. A rotor blade recorder system for accumulating the total number of hours that a rotor blade of a helicopter has been rotating at operational speed, said rotor blade having a root end chamber with a hollow shaft formed therethrough, said system comprising:
    a base mounted within said root end chamber of said rotor blade,
    switch means mounted on said base, said switch means having a switch arm with a first and a second end, said first end pivotally connected to a switch for opening and closing said switch means, and spring means for holding said switch arm in an open position,
    weight means affixed to said switch arm at said second end for overcoming the force of said spring means and closing said switch means when sufficient centrifugal force is generated by a specified RPM of said rotor blade,
    recording means, mounted on said base, said recording means having a self-contained power source, and being connected to and activated by said switch means for accumulating the number of operating hours.

2. A rotor blade recorder system of claim 1 wherein said base comprises a two piece clamp mounted on said hollow shaft formed through said root end and said recording means includes remote reading means.

3. A rotor blade recorder system of claim 1 wherein said recording means includes a digital face, a remote readout, and a ten year power source.

4. A rotor blade recorder system for accumulating the total number of hours that a rotor blade of a helicopter has been rotating at operational speed, said rotor blade having a root end chamber with a hollow shaft formed therethrough, said system comprising:
    a two piece base clamp mounted on said hollow shaft within said root end chamber,
    switch means mounted on said base clamp, said switch means having a switch arm with a first and a second end, said first end pivotally connected to a switch for opening and closing said switch means, and spring means for holding said switch arm in an open position,
    a calibrated weight affixed to said switch arm at said second end for overcoming the force of said spring means and closing said switch means when sufficient centrifugal force is generated by a specified RPM of said rotor blade, and
    an hour meter mounted in a flat plate affixed to said base clamp, said hour meter having a self-contained ten year power source, and includes a digital face, and remote readout terminals, said hour meter being connected to and activated by said switch means for accumulating the number of operating hours.

* * * * *